United States Patent [19]
Keppeler et al.

[11] Patent Number: 5,130,202
[45] Date of Patent: Jul. 14, 1992

[54] MAGNETIC RECORDING MEDIUM CONTAINING AN ISOCYANATE-FREE BRANCHED THERMOPLASTIC POLYURETHANE BINDER RESIN WITH UREA GROUPS AT THE CHAIN ENDS

[75] Inventors: Uwe Keppeler, Ludwigshafen; Michael Bobrich, Boehl-Iggelheim; Guenter Heil; Hermann Roller, both of Ludwigshafen; August Lehner, Roedersheim-Gronau; Werner Lenz; Guenther Schulz, both of Bad Duerkheim, all of Fed. Rep. of Germany

[73] Assignee: BASF Aktiengesellschaft, Ludwigshafen, Fed. Rep. of Germany

[21] Appl. No.: 567,058

[22] Filed: Aug. 13, 1990

[30] Foreign Application Priority Data

Aug. 22, 1989 [DE] Fed. Rep. of Germany ....... 3927659

[51] Int. Cl.⁵ ................................................ G11B 5/00
[52] U.S. Cl. ................................. 428/425.9; 428/694; 428/900
[58] Field of Search ....................... 428/694, 900, 425.9

[56] References Cited

U.S. PATENT DOCUMENTS

| | | | |
|---|---|---|---|
| 2,871,218 | 1/1959 | Schollenberger et al. | 260/45.4 |
| 2,899,411 | 8/1959 | Schollenberger | 260/77.5 |
| 3,320,090 | 5/1967 | Graubart | 117/161 |
| 3,437,510 | 4/1969 | Diaz | 117/62 |
| 3,574,684 | 4/1971 | Higashi | 117/237 |
| 3,650,828 | 3/1972 | Higashi | 117/235 |
| 4,183,976 | 1/1980 | Yamada et al. | 427/130 |
| 4,477,531 | 10/1984 | Kohler et al. | 428/425.9 |
| 4,895,764 | 1/1990 | Lehner et al. | 428/425.9 |

FOREIGN PATENT DOCUMENTS

| | | |
|---|---|---|
| 2234822 | 3/1978 | Fed. Rep. of Germany. |
| 1132956 | 11/1968 | United Kingdom. |
| 1375295 | 11/1968 | United Kingdom. |

OTHER PUBLICATIONS

H. Fikentscher "Cellulose-Chemie" Mar. 13, 1932 58-64.
Abstr. J60-202528 Oct. 1985.
Abstr. J57-158021 Sep. 1982.

*Primary Examiner*—Paul J. Thibodeau
*Assistant Examiner*—Stevan A. Resan
*Attorney, Agent, or Firm*—Keil & Weinkauf

[57] ABSTRACT

Magnetic recording media consist of a nonmagnetic substrate and at least one magnetizable layer which is applied firmly thereon and is based on a polyurethane binder, not less than 50% by weight of binder consisting of a branched polyurethane elastomer having urea groups at the chain ends.

7 Claims, 1 Drawing Sheet

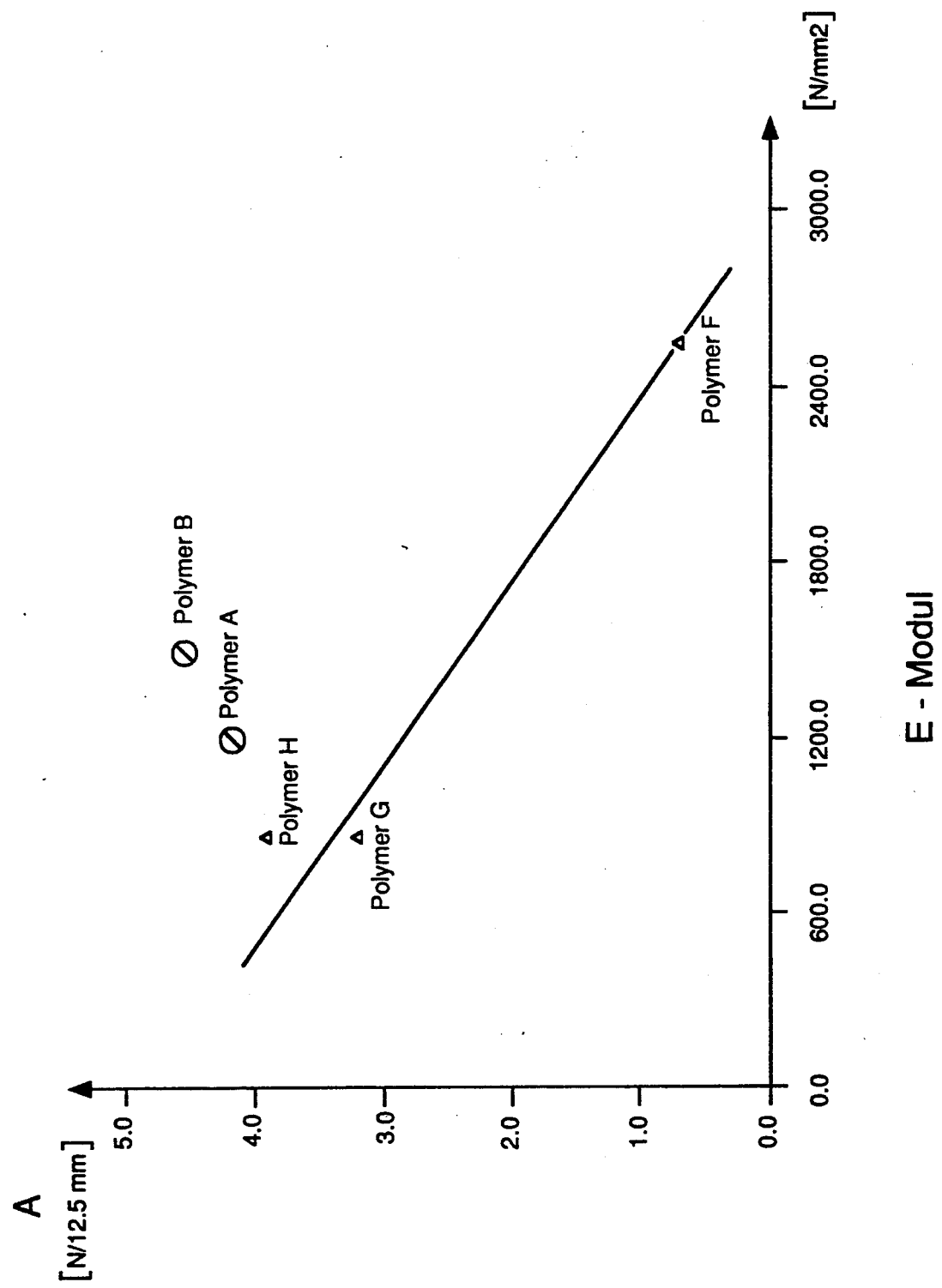

MAGNETIC RECORDING MEDIUM CONTAINING AN ISOCYANATE-FREE BRANCHED THERMOPLASTIC POLYURETHANE BINDER RESIN WITH UREA GROUPS AT THE CHAIN ENDS

The present invention relates to magnetic recording media consisting of a nonmagnetic substrate and at least one magnetizable layer which is firmly applied thereon and is based on a polyurethane binder which consists of not less than 50% by weight of a branched polyurethane elastomer having urea groups at the chain ends.

Magnetic recording media are having to meet constantly increasing requirements with regard to recording, playback and also aging resistance. The binder is becoming increasing important for meeting these requirements.

For example, a higher packing density of the magnetic material in the layer is desirable for improving the magnetic properties, the consequence of this being a reduction in the amount of binder in the layer. Attempts have also been made to achieve an improved signal/noise ratio by the use of finer and finer magnetic materials having a pronounced acicular shape. Furthermore, these materials are very often surface-modified to reduce aging phenomena. Because of such measures, both division of the pigments in the dispersing process and achieving good dispersion stability are made substantially more difficult. In general, however, the magnetic layers must be very flexible and have high resilience and good tensile strength. In addition, to avoid drops in outlet level, a reduction in the coefficient of friction and an increase in the abrasion resistance and resistance to wear are increasingly being required. Furthermore, the mechanical stability of the magnetic layer must also be ensured, in particular at high temperatures and high atmospheric humidity.

Moreover, it is becoming increasingly necessary for magnetic layers of data media (e.g. floppy disk) to be hard-wearing and thus have a long life within a wide temperature range of 5°–40° C. This necessitates the use of larger amounts of liquid lubricants in the binder matrix as internal lubricants.

This also results in disadvantages in terms of the yield of fault-free material, espectially in the production of the coating in the fresh state with little crosslinking and the predominant amount of the lubricant in the interior of the magnetic layer and not at the surface of the magnetic layer.

The larger amount of internal lubricant has an adverse effect on the adhesion of the magnetic layer to the film and the toughness of the magnetic layer due to the effect of the plasticizers. Consequently, the number of tears in the layer during coating and surface treatment of the magnetic layer increases. These disadvantages must be overcome in the overall formulation of the magnetic layer composition by means of the binder components.

It is known that magnetic layers which are subjected to strong mechanical stresses contain polyurethane elastomers which prove to be advantageous binders. Polyesterurethanes as described in DE-B 1 106 959, DE-B 2 753 694, EP-A 0 069 955 or U.S. Pat. No. 2,899,411 have proven particularly useful.

However, these polyurethanes often have disadvantages when used as the sole binders. In many cases, pigment wetting and dispersing is adversely affected, so that any sintered material is not adequately divided during the milling process or agglomeration of the pigment particles is not sufficiently prevented, leading to poor orientability and hence to lower packing densities. Another disadvantage of the stated polyurethanes is that the required resilience is frequently accompanied by insufficient hardness and a tendency to surface tack. It is therefore usual to combine corresponding polyurethanes with other binders. Proposed binder combinations, for example mixtures of polyurethanes with phenoxy resins according to DE-B 1 295 011, with vinylidene chloride/acrylonitrile copolymers according to DE-B 2 037 605 or with polycarbonates according to DE-A 2 114 611, combinations of polyurethane resins with vinyl chloride/vinyl acetate copolymers according to DE-B 1 282 700 or combinations of polyurethane elastomers with copolymers of vinyl chloride and acrylates, as described in, for example, DE-A 2 255 802 or DE-A 2 234 822, have good pigment dispersibility and give layers having good packing density.

However, a magnetic layer obtained by dispersing magnetic particles in a binder for the preparation of the coating material and by applying the latter to a substrate has good mechanical properties only if it possesses sufficient adhesion. Thus, a magnetic layer which does not have sufficient adhesion to a substrate may be destroyed or detached from the substrate film even with the use of a weak force. It is extremely difficult to obtain a magnetic layer which adheres well to a substrate even at high atmospheric humidity and high temperatures. A usable but expensive solution comprises applying an adhesion-promoting layer to the substrate before applying the magnetic layer. The composition of such adhesion-promoting layers has been described in many publications. For example, the use or high molecular weight polyesters is described in U.S. Pat. No. 4,183,976.

However, the application of an adhesion-promoting layer entails additional material, machines and labor. Another disadvantage is that both the special operation and the intermediate layer itself constitute sources of error, and hence the number of errors which is critical in the case of high quality recording media may increase. It is therefore desirable to find economical simple processes which permit the production of fault-free magnetic layers without adhesion promoters, the said layers having excellent mechanical properties and in particular still adhering well particularly under difficult climatic conditions.

These properties which are essential for successful use of the magnetic recording media can only be obtained by using binder combinations having excellent mechanical behavior. It is essential that the binders still exert strong adhesion forces on the pigment surface and on the substrate surface even at high pigment concentrations.

Various mixtures of polyurethanes with polyesters have been described for this purpose (inter alia in DE-B 1 269 661, JP-A 57 158021 and NL-A 66007214). JP-A 60 202528 proposes the use of a binder consisting of a low molecular weight polyisocyanate, a lactone polyester (molecular weight 600-20,000) having 2-8 primary OH groups and a reaction initiator.

However, the measures described are not sufficient for simultaneously meeting all stated requirements for the binder system. Furthermore, it is often essential to combine the polyurethanes with other binders in order to achieve specific effects.

It is an object of the present invention to provide magnetic recording media using thermoplastic and resilient polyurethanes which are readily soluble in ethers and/or ketones and have great surface hardness and a high modulus of elasticity without the tear strength and extensibility being adversely affected as a result. Furthermore, the layer should have good adhesion to the substrate. This high mechanical strength should also be retained at relatively high temperatures. It is a further object of the present invention to design the corresponding recording media in such a way that improved adhesion and higher strength of the mechanical layer are ensured even in the presence of large amounts of lubricant.

We have found that these objects are achieved and that magnetic recording media consisting of a nonmagnetic substrate and at least one magnetic layer which is firmly applied thereon and is based on a magnetic material finely dispersed in a binder consisting of not less than 50% by weight of a thermoplastic polyurethane have the required properties if the thermoplastic polyurethane used is an isocyanate-free, branched polyurethane which is soluble in tetrahydrofuran, has OH-containing urea groups at the chain ends and a molecular weight of from 40,000 to 200,000 and is prepared from
A. 1 mole of a mixture of
  A1) a polydiol having a molecular weight of from 400 to 4,000 and
  A2) a polydiol having a molecular weight greater than 14,000,
  the molar ratio of component A1 to component A2 being greater than or equal to 10,
B. from 0.3 to 10 moles of a mixture of
  B1) an aromatic diol and
  B2) a straight-chain diol of 2 to 10 carbon atoms,
C. from 0.05 to 0.5 mole of a tri- or polyol of 3 to 10 carbon atoms,
D. from 1.3 to 13 moles of a diisocyanate of 6 to 30 carbon atoms and
E. from 0.09 to 2 moles of an amino alcohol of 2 to 16 carbon atoms,
with the proviso that the ratio of the OH groups of components A to C to the NCO groups of component D to the amine groups of component E is 1:1.03–1.3:-0.03–0.3.

The branched polyurethane used in the novel recording media accordingly has from 4 to 30, in particular from 6 to 24, preferably from 8 to 24, OH groups per molecule, which are bonded by urea groups to the chain ends. A molecular weight of not less than 40,000 and not more than 200,000 is required to achieve the required mechanical properties. Molecular weights of from 50,000 to 150,000, in particular from 60,000 to 110,000, are preferred. However, an OH number greater than 30 is disadvantageous in the case of high molecular weights since excessively high OH numbers result in too much branching of the molecules, making preparation and use more difficult, since excessive branching leads to coiled molecules and partially crosslinked polymers. From 1 to 15, in particular from 2 to 10, branches and a theoretical mean chain length of more than 10,000 lead to the desired polyurethane elastomers.

The polyurethanes having such a composition generally possess, in the uncrosslinked state, a hardness greater than 50 s according to DIN 53,157. They also have a modulus of elasticity (according to DIN 53,457) of greater than 500 N/mm$^2$, an elongation at break of greater than 100% (DIN 53,455) and a tensile strength of greater than 30 N/mm$^2$ (DIN 53,455). The softening point is 80° to 180° C.

Polyurethane binders having a high modulus of elasticity are generally not only hard and brittle but also have little adhesion to polyester substrate films. However, the binders present in the novel recording media have substantially improved adhesion both to flexible polymer substrates and to metal surfaces. The good mechanical properties are also retained at elevated temperatures. Surprisingly, the adhesive strength is not adversely affected even on storage under conditions of high temperature and humidity. Furthermore, the dispersibility of the magnetic materials is also improved.

In another embodiment of the novel recording media, a polyisocyanate is added to the dispersion, essentially consisting of the magnetic material and the special polyurethane, before application to the substrate. For crosslinking, a large number of organic di-, tri- or polyisocyanates or isocyanate prepolymers having a molecular weight of up to 10,000, preferably from 500 to 3,000, may be used. Polyisocyanates or isocyanate prepolymers which carry more than 2 NCO groups per molecule are preferred. Polyisocyanates based on toluylene diisocyanate, hexamethylene diisocyanate or isophorone diisocyanate, which are formed by polyaddition with di- and triols or by biuret and isocyanurate formation, have proven particularly suitable. An adduct of toluylene diisocyanate with trimethylolpropane and diethylene glycol is particularly advantageous. By mixing the abovementioned isocyanates, preferably with the prepared magnetic dispersion before application to the substrate, the adhesion strength after storage under conditions of high temperature and humidity are very substantially further improved and in addition the abrasion resistance of the novel recording media can be very substantially further improved with a reduction in the thermoplasticity of the magnetic layer. The amount of polyisocyanates added for this purpose is in general about 1–20, preferably 4–15, % by weight, based on the total amount of binder.

The polyurethane which characterizes the novel recording media is composed of components known per se.

A polyesterol, polyetherol or polycarbonate having a molecular weight of from 400 to 4,000, preferably from 700 to 2,500, is used as component A1 (polydiol). The polydiols are advantageously predominantly linear polymers having two terminal OH groups. The acid number of the polydiols is less than 10, preferably less than 3. The polyesterols can be prepared in a simple manner by esterifying aliphatic or aromatic dicarboxylic acids of 4 to 15, preferably 4 to 8, carbon atoms with aliphatic or cycloaliphatic glycols, preferably of 2 to 20 carbon atoms, or by polymerization of a lactone of 3 to 10 carbon atoms. Examples of suitable dicarboxylic acids are glutaric acid, pimelic acid, suberic acid, sebacic acid, dodecanoic acid, terephthalic acid, isophthalic acid and preferably adipic acid, succinic acid and terephthalic acid. The dicarboxylic acids can be used individually or as mixtures. For the preparation of the polyesterols, it may be advantageous to use the corresponding acid derivatives, such as anhydrides or acyl chlorides, instead of the dicarboxylic acids. Examples of suitable glycols are diethylene glycol, pentanediol, 1,10-decanediol and 2,2,4-trimethyl-1,5-pentanediol. 1,2-Ethanediol, 1,4-butanediol, 1,6-hexanediol and 2,2-dimethyl-1,3-propanediol, 1,4-dimethylolcyclohexane, 1,4-diethanolcyclohexane and 1,4-diethanolpropane are preferably used. Suitable lactones for the preparation of the polyesterols are, for example, α,α-dimethyl-β-propiolactone, butyrolactone and preferably caprolactone. Polyetherols are, for example, polytetrahydrofuran or a diol of polypropylene oxide. The polycarbonates are generally based on 1,6-hexanediol.

A polyester having a molecular weight ($M_w$) of $\geq 14,000$ is used as component A2 (polydiol). The products are soluble, linear, thermoplastic copolyesters having two terminal OH groups.

The products contain aromatic components. Corresponding commercial products are, for example, the ®Dynapol L grades from Dynamit Nobel or ®PE 49 000 from DuPont.

Aromatic diols, preferably bisphenol A or its derivatives, are used as component B1. Corresponding products are available, for example, under the names Dianol® 22 or Dianol® 33 from Akzo.

The straight-chain aliphatic diols of 2 to 10, preferably 4 to 6, carbon atoms are used as component B2, for example 1,2-ethanediol, 1,3-propanediol, 1,4-butanediol, 1,6-hexanediol, 1,5-pentanediol, 1,10-decanediol, 2-methyl-1,3-propanediol, 2-methyl-2-butyl-1,3-propanediol, 2,2-dimethyl-1,4-butanediol, 2-methyl-2-butyl-1,3-propanediol, neopentylglycol hydroxypicalate, diethylene glycol, triethylene glycol and methyldiethanolamine, 1,4-dimethylolcyclohexane and 1,4-diethanolcyclohexane.

Compounds of 3 to 10, preferably 3 to 6, carbon atoms are used as triols for component C. Examples of corresponding triols are glycerol or trimethylolpropane. Low molecular weight reaction products of, for example, trimethylolpropane with ethylene oxide and/or propylene oxide are also suitable. The presence of triols during the polyaddition leads to branching of the end product which, provided that no local crosslinking occurs, has an advantageous effect on the mechanical properties of the polyurethane. Examples of suitable polyols are erythritol, pentaerythritol and sorbitol.

For the formation of the NCO-containing intermediates, the components stated under A, B and C are reacted with aliphatic, cycloaliphatic or aromatic diisocyanates of 6 to 30 carbon atoms (component D). Compounds such as toluylene 2,4-diisocyanate, toluylene 2,6-diisocyanate, m-phenylene diisocyanate, 4-chlorophenylene 1,3-diisocyanate, naphthylene 1,5-diisocyanate, hexamethylene 1,6-diisocyanate, cyclohexylene 1,4-diisocyanate and tetrahydronaphthylene 1,5-diisocyanate, diphenylmethane diisocyanate, dicyclohexylmethane diisocyanate, isophorone diisocyanate or mixtures thereof are suitable for this purpose.

The NCO-containing intermediates obtained from A to D are then reacted with component E. For the OH-containing polyurethaneurea elastomers, this component is an amino alcohol of 2 to 16, preferably 3 to 6, carbon atoms, including monoethanolamine, methylisopropanolamine, ethylisopropanolamine, methylethanolamine, 3-aminopropanol, 1-ethylaminobutan-2-ol, 4-methyl-4-amino-pentan-2-ol and N-(2-hydroxyethyl)-aniline. Diolamines are particularly suitable since, as a result of their addition at the chain end, the OH number of the polymers is doubled. Diethanolamine and diisopropanolamine have proven particularly advantageous. For the OH-containing polyurethaneurea elastomers, monoamines, e.g. dimethylamine, ethylpropylamine or dibutylamine, are used as component E.

The ratio of components A to D can be varied from 1.35 to 13 moles of diisocyanate per mole of polydiol when using from 0.3 to 10 moles of the diol of 2 to 20 carbon atoms and from 0.05 to 0.5 mole of triol, the amount of the diol used partly depending on the molecular weight of the polydiol used. For practical reasons, however, it is advantageous to use the diisocyanate in not less than 3% excess over and above the amounts required for complete conversion of the reactants, so that the ratio of the number of isocyanate groups used to the number of hydroxyl groups in the reaction mixture is from 1.03 to 1.3, preferably from 1.05 to 1.15. The NCO excess is then reacted stoichiometrically with the NH groups of the amino alcohol, so that the ratio of components (A to C):D:E is 1:1.03–1.3:0.03–0.3, preferably 1:1.05–1.15:0.05–0.15.

The thermoplastic, resilient OH-containing or OH-free polyurethanes having this composition are prepared in solution by the two-stage process, in the presence or absence of the catalysts and other assistants and/or additives. It is not possible to prepare these products by the solvent-free batch process. Since the presence of the triol and the reaction of amine with NCO groups in the polyaddition in the absence of a solvent results in at least partial formation of gel particles, the procedure is carried out in solution. In general, a solution polyaddition avoids the danger of local overcross-linking, as occurs in polyaddition in the absence of a solvent.

In the two-stage process, two different procedures are possible depending on the reaction conditions (amount of solvent, heat of reaction).

Procedure 1: The diisocyanate is initially taken with a little solvent, after which building blocks A, B, C and, if required, the catalyst and the assistants and additives are added in solvents at from 20° to 90° C., preferably from 30° to 70° C., in the course of from 0.2 to 5 hours. The components are reacted until the desired NCO content is obtained, after which building block E is added in the second stage.

Procedure 2: In this process, all starting components A to D are dissolved in some of the solvent so that solutions having a solids content of from 15 to 50% by weight are formed. Thereafter, the stirred solutions are heated to 20°–90° C., preferably 30°–70° C., if necessary after the addition of catalyst. The components are then reacted until the desired NCO content is obtained, after which building block E is added in the second stage.

In the two-stage process, an excess of NCO over the building blocks A to C is used in the first stage. In both procedures, it is possible to begin the reaction in some of the solvent and to add the remaining solvent during or after the reaction.

Cyclic ethers, such as tetrahydrofuran and dioxane, and cyclic ketones, such as cyclohexanone, are preferably used as solvents for the preparation of the polyurethanes. Depending on the field of use, it is of course also possible to dissolve the polyurethanes in other strongly polar solvents, such as dimethylformamide, N-methylpyrrolidone, dimethyl sulfoxide or ethylene glycol acetate. The stated solvents can also be mixed with aromatics, such as toluene or xylene, and esters, such as ethyl or butyl acetate.

Examples of suitable catalysts for the preparation of the polyurethanes and for the crosslinking reaction are tertiary amines, such as triethylamine, triethylenediamine, N-methylpyridine and N-methylmorpholine, metal salts, such as tin octoate, lead octoate and zinc stearate, and organic metal compounds, such as dibutyltin dilaurate. The suitable amount of catalyst is dependent on the activity of the relevant catalyst. In general, it has proven advantageous to use from 0.005 to 0.3, preferably from 0.01 to 0.1, part by weight per 100 parts by weight of polyurethane.

The polyurethanes which are typical of the novel recording media can be used as sole binders for the production of magnetic layers. For special intended uses, however, it may be advantageous in the case of magnetic recording media to add a second binder component in amounts of from 5 to 50, preferably from 10 to 40, parts by weight, based on the resulting total amount of binder. The physically drying binders present in the binder mixture with the stated special polyurethanes are known. They are, for example, a polyvinylformal binder which has been prepared by hydrolysis of a polymer of a vinyl ester and subsequent reaction of the vinyl alcohol polymer with formaldehyde. The polyvinylformals advantageously contain not less than 65, in particular not less than 80, % by weight of vinylformal groups. Suitable polyvinylformals contain from 5 to 13% by weight of vinyl alcohol groups and from 80 to 88% by weight of vinylformal groups and have a specific gravity of about 1.2 and a viscosity of from 50 to 120 mPa.s, measured at 20° C. using a solution of 5 g of polyvinylformal in 100 ml of 1:1 phenol/toluene, having a Fikentscher K value of from 40 to 70 (1% strength in dimethylformamide). In addition to the polyvinylformal, vinyl chloride/diol mono- or di(meth)acrylate copolymers, which can be prepared, for example, in a known manner by solution copolymerization or suspension copolymerization of vinyl chloride and the diol monomethacrylate or monoacrylate, are also suitable. The diol mono- or diacrylate or -methacrylate used for this purpose is an esterification product of acrylic acid or methacrylic acid with the corresponding molar amount of aliphatic diol of 2 to 4 carbon atoms, such as ethylene glycol, 1,4-butanediol or, preferably, propanediol, the propanediol preferably consisting of 1,3-propanediol and from 0 to 50% by weight of 1,2-propanediol. The copolymers advantageously contain from 50 to 95% by weight of vinyl chloride and from 5 to 50% by weight of diol acrylate or methacrylate. Particularly suitable copolymers preferably contain from 70 to 90% by weight of vinyl chloride and from 10 to 30% by weight of diol monoacrylate or diol monomethacrylate. A 15% strength solution of particularly suitable copolymers, such as the vinyl chloride/-propanediol monoacrylate copolymers, in a mixture of equal amounts by volume of tetrahydrofuran and dioxane has a viscosity of about 30 mPa.s at 25° C. The K value according to H. Fikentscher (Cellulosechemie 13 (1932), 58 et seq.) of the particularly suitable products is from 30 to 50, preferably about 40 (1% in dimethylformamide). It is also possible to use phenoxy resins whose constitution corresponds to the formula

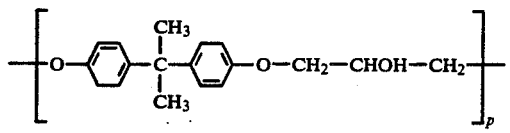

where p is almost 100. These are polymers as described in, for example, DE-B 1 295 011. Cellulose ester binders in the binder mixture defined are also suitable. These are esterification products of cellulose with carboxylic acids of 1 to 4 carbon atoms, e.g. cellulose acetate, cellulose triacetate, cellulose acetopropionate and cellulose acetobutyrate.

Processing of the special branched polyurethanes, if necessary as a mixture with other binders, together with the magnetic material and the conventional assistants to give the novel recording media is carried out in a conventional manner.

Suitable anisotropic magnetic materials are the conventional pigments, which have a substantial effect on the properties of the resulting magnetic layers, for example gamma-iron(III) oxide, finely divided magnetite, ferromagnetic undoped or doped chromium dioxide or cobalt-modified gamma-iron(III) oxide and ferrites and metal pigments. Acicular gamma-iron(III) oxide, Co-doped iron(III) oxide and ferromagnetic chromium dioxide are preferred. The particle size is in general from 0.15 to 2 $\mu$m, preferably from 0.15 to 0.8 $\mu$m.

The magnetic layers furthermore contain small amounts of additives, such as dispersants and/or lubricants, as well as fillers, which are admixed during dispersing of the magnetic materials or during the production of the magnetic layer. Examples of such additives are fatty acids or isomerized fatty acids, such as stearic acid or salts thereof with metals of main groups 1 to 4 of the Periodic Table of elements, amphoteric electrolytes, such as lecithin, and fatty acid esters or waxes, silicone oils, carbon black, etc. The amount of the additives is the usual amount and is in general less than 10% by weight, based on the magnetic layer.

The ratio of magnetic material to binder in the novel recording materials is from 1 to 10, in particular from 3 to 6, parts by weight of magnetic material per part by weight of binder mixture. A particular advantage is the fact that, owing to the excellent pigment-binding capacity of the special polyurethanes, high concentrations of magnetic material in the magnetic layers are possible without the mechanical and resilient properties deteriorating or the performance characteristics markedly suffering.

Suitable nonmagnetic and nonmagnetizable substrates are the conventional rigid or flexible substrate materials, in particular films of linear polyesters, such as polyethylene terephthalate, in general having a thickness of from 4 to 200 $\mu$m, in particular from 6 to 36 $\mu$m. Recently, the use of the magnetic layers on paper substrates for electronic computing and accounting machines has also become important; the novel coating materials can advantageously be used for this purpose too.

The novel magnetic recording media can be produced in a known manner. Advantageously, the magnetic pigment dispersion prepared in a dispersing apparatus, for example a tubular ball mill or a stirred ball mill, from the magnetic material and a solution of the binder with the addition of dispersants and other additives is mixed with the polyisocyanate crosslinking agent if necessary and then filtered and is applied to the nonmagnetic substrate by means of a conventional coating apparatus, for example a knife coater. As a rule, magnetic orientation is carried out before the liquid coating mixture is dried on the substrate; the latter is advantageously carried out in the course of from 10 to 200 seconds at from 50° to 90° C. The magnetic layers can be calendered and compacted on conventional machines by being passed between heated and polished rollers, if necessary with the use of pressure and at from 25° to 100° C., preferably from 60° to 80° C.

In crosslinking of the binders, which may be additionally carried out, it has proven very advantageous to perform the calendering before the crosslinking is complete, since the OH-containing polymers in the uncrosslinked state can be very readily compacted without sticking. The thickness of the magnetic layer is in general from 0.5 to 20 µm, preferably from 1 to 10 µm. In the case of the production of magnetic tapes, the coated films are slit in the longitudinal direction into the usual widths generally specified in inches.

Compared with the magnetic recording media produced using the prior art polyurethanes or polyurethane mixtures having suitable harder coating resin components as binders, the novel magnetic recording media have improved adhesive or peel strength. Also important is the fact that, in the novel polyurethane, the known magnetic materials can be processed readily and in particular with very little expenditure of time and energy, in a conventional dispersing apparatus, to give homogeneous highly pigmented dispersions. In addition, improved magnetic recording media can be obtained in a simpler and shorter procedure with the aid of the polyisocyanate-crosslinked OH-containing polyurethane binder. Another advantage is that the polymers which are suitable for the novel magnetic recording media give magnetic layers which are stable even at elevated temperatures and high atmospheric humidity.

In the Examples and Comparative Experiments, parts and percentages are by weight, unless stated otherwise. Parts by volume bear the same relation to parts by weight as that of the liter to the kilogram.

EXAMPLE 1 a) Preparation of polymer A

In a heatable reaction vessel having a capacity of 150,000 parts by volume and equipped with a stirrer and reflux condenser, 7,143 parts of polycarbonatediol (molecular weight 2,000), 4,821 parts of a linear copolyester (molecular weight 18,000–20,000), 632 parts of 1,6-hexanediol, 2,737 parts of ethoxylated 2,2-bis-(4-hydroxyphenyl)-propane and 80 parts of trimethylolpropane, together with 3,672 parts of diphenylmethane 4,4'-diisocyanate and 935 parts of toluylene diisocyanate, are dissolved in 60,061 parts of tetrahydrofuran and the solution is heated to 55° C. The components are reacted to a final viscosity of 7 Pa.s (at 60° C.). The NCO content is 0.08%. The solids content is then brought to 16.5% by dilution with 42,431 parts of tetrahydrofuran. At the same time, the reaction is stopped by the addition of 233 parts of diethanolamine. The K value of the polymer formed is 63.9 measured using a 1% strength solution in dimethylformamide.

b) Preparation of dispersion A 810 g of a Co-doped iron oxide having a mean particle size of 0.23 µm, a length/width ratio of from 4:1 to 7:1, a coercive force of 52 kAm$^{-1}$ and a specific surface area of 42 m$^2$g$^{-1}$ and 90 g of a ferromagnetic chromium dioxide pigment having a mean particle size of 0.24 µm, a length/width ratio of from 5:1 to 8:1, a coercive force of 48 kAm$^{-1}$ and a specific surface area of 30 m$^2$g$^{-1}$, together with 8 kg of carbon black having a specific surface area of >150 m$^2$g$^{-1}$, 45 g of a chromium(III) oxide as an auxiliary pigment, 850 g of a 16.5% strength solution of polymer A, 90 g of a 25% strength solution of a vinyl chloride/vinyl acetate/vinyl alcohol copolymer (VAGH® from Union Carbide) in 1:1 tetrahydrofuran/dioxane, 22 g of lecithin as a dispersant, 11 g of stearic acid, 11 g of methyl stearate as a lubricant and 1,378 g of a mixture of equal amounts of tetrahydrofuran and dioxane, are introduced into a steel ball mill having a capacity of 6 l and containing 8 g of steel balls having a diameter of 4–6 mm, and are dispersed for 120 hours.

The magnetic dispersion is then filtered under pressure through a filter of 5 µm pore size, 31.5 g of a 50% strength solution of a triisocyanate obtained from 3 moles of toluylene diisocyanate and 1 mole of trimethylolpropane are added while stirring, and immediately thereafter the mixture is applied to a 15 µm thick polyethylene terephthalate film. The coated film is passed through a magnetic field to orient the magnetic particles and then dried at from 60° to 90° C. The magnetic layer is compacted by passage between heated rollers (60° C., nip pressure 200 kg/cm). The thickness of the magnetic layer is 4 µm. The coated film is then slit into video tapes ½ inch wide.

EXAMPLE 2 a) Preparation of polymer B

The composition and preparation are as in Example 1, except that, instead of the stopping agent diethanolamine, the corresponding molar amount of dibutylamine is used.

b) Preparation of dispersion B

The process is carried out as in Example 1b, except that the polyurethane elastomer used is polymer B and the vinyl acetate/vinyl alcohol copolymer (VAGH) is likewise replaced by polymer B and the chromium(III) oxide by 52 g of Al$_2$O$_3$. Instead of the 31.5 g of the 50% strength solution of the triisocyanate, 25 g of the same solution are added.

COMPARATIVE EXPERIMENT 1 a) Preparation of polymer C

In a heatable reaction vessel having a capacity of 150,000 parts by volume and equipped with a stirrer and reflux condenser, 10,237 parts of a polyesterdiol from adipic acid and 1,4-butanediol (molecular weight 1,000), 1,207 parts of 1,4-butanediol and 65 parts of trimethylolpropane, together with 6,277 parts of diphenylmethane 4,4'-diisocyanate, are dissolved in 53,358 parts of tetrahydrofuran and the solution is heated to 55° C. The components are reacted to a final viscosity of 2 Pa.s (at 60° C.). The NCO content is 0.06%. The solids content is then brought to 12.5% by dilution with 71,144 parts of tetrahydrofuran. At the same time, the reaction is stopped by the addition of 190 parts of diethanolamine. The K value of the polymer formed is 63.0, measured using a 1% strength solution in dimethylformamide.

b) Preparation of dispersion C:

The process is as in Example 1b, except that the polyurethane elastomer used is polymer C. 1,130 g of a mixture of equal amounts of tetrahydrofuran and dioxane are used.

COMPARATIVE EXAMPLE 2

Preparation of dispersion D

The process is carried out as in Example 1b, except that in this case the polyurethane elastomer is replaced by a polyurethane prepared by the melt condensation method according to German Published Application DAS No. 1,295,011. Thus, 1,130 g of a 12.5% strength solution of this polymer and 1,100 g of a mixture of equal amounts of tetrahydrofuran and dioxane are used.

COMPARATIVE EXPERIMENT 3 a) Preparation of polymer E

In a heatable reaction vessel having a capacity of 150,000 parts by volume and equipped with a stirrer and reflux condenser, 10,714 parts of a polycarbonatediol (molecular weight 2,000), 948 parts of 1,6-hexanediol, 4,232 parts of ethoxylated 2,2-bis-(4-hydroxyphenyl)-propane and 120 parts of trimethylolpropane, together with 5,640 parts of diphenylmethane 4,4'-diisocyanate and 1,262 parts of toluylidene diisocyanate, are dissolved in 53,472 parts of tetrahydrofuran and the solution is heated to 55° C. The components are reacted to a final viscosity of 20 Pa.s (at 60° C.). The NCO content is 0.04%. The solids content is then brought to 20.0% by dilution with 39,230 parts of tetrahydrofuran. At the same time, the reaction is stopped by adding 259 parts of diethanolamine. The K value of the polymer formed is 63.0, measured using a 1% strength solution in dimethylformamide.

b) Preparation of dispersion E 100,000 parts of steel balls, 16,000 parts of the solution of polymer E, diluted to 12.5%, 10,000 parts of a 10% strength solution of a polyvinylformal, consisting of 80% of vinylformal units, 12% of vinyl acetate units and 6% of vinyl alcohol units and having a K value of 50 (1% strength in dimethylformamide), 67.5 parts of N-tallow fat-1,3-diaminodioleate, 270 parts of zinc stearate and 13,500 parts of a ferromagnetic chromium dioxide pigment having a mean particle size of 0.5 μm and a length/width ratio of from 4:1 to 9:1 and 4,500 parts of tetrahydrofuran are introduced into a steel ball mill having a capacity of 1,000 parts by volume and operated at about 40 revolutions per minute, and are dispersed for 120 hours. The magnetic dispersion is then filtered under pressure through a filter of 5 μm pore size. A 20 μm thick polyethylene terephthalate film is then coated with the magnetic dispersion by the conventional method using a knife coater and, after passing through a magnetic field, the coating is dried at from 60° to 100° C. The magnetic layer is compacted and calendered by passage between heated rollers (70° C.) under pressure. The resulting thickness is 5 μm. The coated film is then slit into audio tapes 3.81 mm wide.

COMPARATIVE EXPERIMENT 4

Preparation of polymer F

In a heatable reaction vessel having a capacity of 150,000 parts by volume and equipped with a stirrer and reflux condenser, 6,726 parts of a polycarbonatediol (molecular weight 2,000), 4,445 parts of a linear copolyester obtained from a mixture of isophthalic/terephthalic acid and diethylene glycol (molecular weight 3,300), 595 parts of 1,6-hexanediol, 2,577 parts of ethoxylated 2,2-bis-(4-hydroxyphenyl)-propane and 75 parts of trimethylolpropane, together with 3,772 parts of diphenylmethane 4,4'-diisocyanate and 866 parts of toluylidene diisocyanate, are dissolved in 57,170 parts of tetrahydrofuran and the solution is heated to 55° C. The components are reacted to a final viscosity of 6 Pa.s (at 60° C.). The NCO content is 0.06%. The solids content is then brought to 16.5% by dilution with 40,377 parts of tetrahydrofuran. At the same time, the reaction is stopped by the addition of 219 parts of diethanolamine. The K value of the polymer formed is 60.7, measured using a 1% strength solution in dimethylformamide.

COMPARATIVE EXPERIMENT 5

Preparation of polymer G

In a heatable reaction vessel having a capacity of 150,000 parts by volume and equipped with a stirrer and reflux condenser, 6,849 parts of a polycarbonatediol (molecular weight 2,000), 4,479 parts of a linear copolyester obtained from a mixture of isophthalic/terephthalic acid and diethylene glycol (molecular weight 4,360), 606 parts of 1,6-hexanediol, 2,624 parts of ethoxylated 2,2-bis-(4-hydroxyphenyl)-propane and 77 parts of trimethylolpropane, together with 3,772 parts of diphenylmethane 4,4'-diisocyanate and 866 parts of toluylidene diisocyanate, are dissolved in 57,820 parts of tetrahydrofuran and the solution is heated to about 55° C. The components are reacted to a final viscosity of 6 Pa.s (at 60° C.). The NCO content is 0.06%. The solids content is then brought to 16.5% by dilution with 40,844 parts of tetrahydrofuran. At the same time, the reaction is stopped by the addition of 223 parts of diethanolamine. The K value of the polymer formed is 59.6, measured using a 1% strength solution in dimethylformamide.

COMPARATIVE EXPERIMENT 6

Preparation of polymer H

In a heatable reaction vessel having a capacity of 150,000 parts by volume and equipped with a stirrer and reflux condenser, 6,351 parts of a polycarbonatediol (molecular weight 2,000), 4,288 parts of a linear copolyester obtained from terephthalic acid and ethoxylated 2,2-bis-(4-hydroxyphenyl)-propane (molecular weight 1,850), 562 parts of 1,6-hexanediol, 2,433 parts of ethoxylated 2,2-bis-(4-hydroxyphenyl)-propane and 71 parts of trimethylolpropane, together with 3,772 parts of diphenylmethane 4,4'-diisocyanate and 866 parts of toluylidene diisocyanate, are dissolved in 55,028 parts of tetrahydrofuran and the solution is heated to 55° C. The components are reacted to a final viscosity of 7 Pa.s (at 60° C.). The NCO content is 0.05%. The solids content is then brought to 16.5% by dilution with 38,844 parts of tetrahydrofuran. At the same time, the reaction is stopped by the addition of 207 parts of diethanolamine. The K value of the polymer formed is 61.7, measured using a 1% strength solution in dimethylformamide.

Compared with similar products, the novel polyurethanes have substantially greater adhesion of A to polyester films and vice versa with a corresponding modulus of elasticity (THE FIGURE).

The adhesion is determined according to DIN 53,289. The polyurethanes have been crosslinked with a polyisocyanate. The amount added corresponds to the OH number which results from the added amount of the amino alcohol in the synthesis of the polyurethane.

The use of the novel polyurethanes leads to an improvement in the degree of dispersion of the dispersions (Table 1).

TABLE 1

|  | Gloss |
|---|---|
| Dispersion A | 99 |
| Dispersion C | 76 |

TABLE 1-continued

| | Gloss |
|---|---|
| Dispersion D | 74 |

The following measurements were carried out on the magnetic recording media intended for the video sector, on a VHS recorder from Victor Company of Japan, against the reference tape BRV 84 (0 dB):

(1) Video output level (luminance signal): Luminance signal of a 100% white image, measured using the noise voltage meter UPSF from Rohde und Schwarz (>100 kHz).

(2) Video S/N: Ratio of the luminance signal of a 100% white image to the noise level, measured using the noise voltage meter UPSF from Rohde und Schwarz (>100 kHz).

(3) Chroma S/N: Ratio of the chroma signal of a red area to the noise level, measured using the noise voltage meter UPSF from Rohde und Schwarz (100 kHz-3 MHz).

(4) Continuous operation in a humid climate: In the VHS recorder, the cassettes are subjected to continuous operation of 100 cycles of 2 hours each at 40° C. and 85% relative humidity. The video head wear which occurs during this time is stated in μm per 100 hours operation.

(5) The adhesive strength of the magnetic layer was determined according to ECMA Standard No. 120, Section 5.11, page 6. In measuring the peel strength, the film side of a tape is drawn at a defined angle over a sharp-edged blade. The tape tension, which is measured until a layer peels off (over the blade), is continuously increased. The tape tension at the time of delamination is a measure of the peel strength.

The results of the measurements are shown in Tables 2 and 3.

TABLE 2

| | Layer adhesion [cN] |
|---|---|
| Dispersion A | 200 |
| Dispersion C | 144 |
| Dispersion D | 85 |

TABLE 3

| | Luminance signal | S/N | Chroma S/N | Continuous operation | Head wear |
|---|---|---|---|---|---|
| Dispersion A | +3.4 | +4.3 | +2.0 | Satisfactory | 3 |
| Dispersion B | +3.2 | +4.5 | +1.5 | Satisfactory | 5 |
| Dispersion D | +3.6 | +4.6 | +2.0 | Blocked | — |

We claim:

1. A magnetic recording medium consisting of a nonmagnetic substrate and at least one magnetic layer which is applied thereon and is based on a magnetic material finely distributed in a binder consisting of not less than 50% by weight of a thermoplastic polyurethane, wherein the thermoplastic polyurethane used is an isocyanate-free, branched polyurethane which is soluble in tetrahydrofuran, has OH-containing urea groups at the chain ends and a molecular weight of from 40,000 to 200,000 and is prepared from
    A. 1 mole of a mixture of
        A1) a polydiol having a molecular weight of from 400 to 4,000 and
        A2) a polydiol having a molecular weight greater than 14,000,
        the molar ratio of component A1 to component A2 being greater than or equal to 10,
    B. from 0.3 to 10 moles of a mixture of
        B1) an aromatic diol and
        B2) a straight-chain diol of 2 to 10 carbon atoms,
    C. from 0.05 to 0.5 mole of a tri- or polyol of 3 to 10 carbon atoms,
    D. from 1.3 to 13 moles of a diisocyanate of 6 to 30 carbon atoms and
    E. from 0.09 to 2 moles of an amino alcohol of 2 to 16 carbon atoms,
    with the proviso that the ratio of the OH groups of components A to C to the NCO groups of component D to the amine groups of component E is 1:1.03–1.3:-0.03–0.3.

2. A magnetic recording medium consisting of a nonmagnetic substrate and at least one magnetic layer which is firmly applied thereon and is based on a magnetic material finely distributed in a binder consisting of not less than 50% by weight of a thermoplastic polyurethane, wherein the thermoplastic polyurethane used is an isocyanate-free, branched polyurethane which is soluble in tetrahydrofuran, has urea groups at the chain ends and a molecular weight of from 40,000 to 200,000 and is prepared from
    A. 1 mole of a mixture of
        A1) a polydiol having a molecular weight of from 400 to 4,000 and
        A2) a polydiol having a molecular weight greater than 14,000,
        the molar ratio of component A1 to component A2 being greater than or equal to 10,
    B. from 0.3 to 10 moles of a mixture of
        B1) an aromatic diol and
        B2) a straight-chain diol of 2 to 10 carbon atoms,
    C. from 0.05 to 0.5 mole of a tri- or polyol of 3 to 10 carbon atoms.
    D. from 1.3 to 13 moles of a diisocyanate of 6 to 30 carbon atoms and
    E. from 0.09 to 2 moles of an OH-free monoamine of 2 to 16 carbon atoms,
    with the proviso that the ratio of the OH groups of components A to C to the NCO groups of component D to the amine groups of component E is 1:1.03–1.3:-0.03–0.3.

3. A magnetic recording medium as claimed in claim 1, wherein the isocyanate-free, branched polyurethane which is soluble in tetrahydrofuran and has OH-containing urea groups at the chain ends and a molecular weight of from 40,000 to 200,000 is crosslinked with an isocyanate from the groups consisting of the di-, tri- and polyisocyanates and of the isocyanate prepolymers having a molecular weight of not more than 10,000.

4. A magnetic recording medium as claimed in claim 2, wherein the isocyanate-free, branched polyurethane which is soluble in tetrahydrofuran and has urea groups at the chain ends and a molecular weight of from 40,000 to 200,000 is crosslinked with an isocyanate from the groups consisting of the di-, tri- and polyisocyanates and of the isocyanate prepolymers having a molecular weight of not more than 10,000.

5. A magnetic recording medium as claimed in claim 1, wherein the component B1) is a compound of the formula (I)

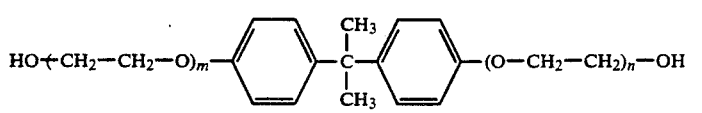
(I)

where m and n independently of one another may each be 0, 1 or 2.

6. A magnetic recording medium as claimed in claim 1, wherein more than 80% of the terminal OH groups consist of a

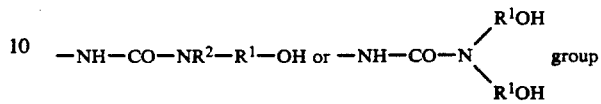 group where $R^1$ is $-(CH_2)_n-$, $R^2$ is H, $-CH_3$ or $-(CH_2)_m-CH_3$, n is from 2 to 10 and m is from 1 to 10.

7. A magnetic recording medium as claimed in claim 1, wherein the isocyanate-free branched polyurethane which is soluble in tetrahydrofuran and has OH-containing urea groups at the chain ends is used as the sole binder.

* * * * *